United States Patent
Desai et al.

(10) Patent No.: US 7,801,859 B1
(45) Date of Patent: Sep. 21, 2010

(54) TRACKING FILESYSTEM BACKUPS

(75) Inventors: Asit Desai, San Ramon, CA (US);
Richard Zulch, Orinda, CA (US)

(73) Assignee: EMC Corporation, Hopkinton, MA (US)

( * ) Notice: Subject to any disclaimer, the term of this patent is extended or adjusted under 35 U.S.C. 154(b) by 646 days.

(21) Appl. No.: 11/138,065

(22) Filed: May 25, 2005

(51) Int. Cl.
*G06F 7/00* (2006.01)

(52) U.S. Cl. ...................................... 707/640

(58) Field of Classification Search ................. 707/204, 707/205, 203, 100–103, 640–647
See application file for complete search history.

(56) References Cited

U.S. PATENT DOCUMENTS

| | | | |
|---|---|---|---|
| 757,695 A * | 4/1904 | Turbayne | 322/13 |
| 6,205,527 B1 * | 3/2001 | Goshey et al. | 711/162 |
| 6,647,399 B2 * | 11/2003 | Zaremba | 707/204 |
| 6,785,786 B1 * | 8/2004 | Gold et al. | 711/162 |
| 6,865,655 B1 * | 3/2005 | Andersen | 711/162 |
| 6,889,249 B2 * | 5/2005 | Miloushev et al. | 709/213 |
| 6,928,444 B2 * | 8/2005 | Richard | 707/10 |
| 7,103,740 B1 * | 9/2006 | Colgrove et al. | 711/162 |
| 7,111,014 B2 * | 9/2006 | Sawdon et al. | 707/102 |
| 7,155,465 B2 * | 12/2006 | Lee et al. | 707/204 |
| 7,171,538 B2 * | 1/2007 | Kisley et al. | 711/173 |
| 7,222,194 B2 * | 5/2007 | Kano et al. | 709/248 |
| 7,246,140 B2 * | 7/2007 | Therrien et al. | 707/202 |
| 7,246,211 B1 * | 7/2007 | Beloussov et al. | 711/162 |
| 2001/0034737 A1 * | 10/2001 | Cane et al. | 707/204 |
| 2002/0120763 A1 * | 8/2002 | Miloushev et al. | 709/230 |
| 2003/0135514 A1 * | 7/2003 | Patel et al. | 707/102 |
| 2003/0158831 A1 * | 8/2003 | Zaremba | 707/1 |
| 2004/0030852 A1 * | 2/2004 | Coombs et al. | 711/162 |
| 2004/0064488 A1 * | 4/2004 | Sinha | 707/204 |
| 2004/0139128 A1 * | 7/2004 | Becker et al. | 707/204 |
| 2004/0153479 A1 * | 8/2004 | Mikesell et al. | 707/200 |
| 2004/0230863 A1 * | 11/2004 | Buchhorn | 714/6 |
| 2006/0059384 A1 * | 3/2006 | Helliker | 714/13 |
| 2006/0064444 A1 * | 3/2006 | van Ingen et al. | 707/204 |
| 2006/0129685 A1 * | 6/2006 | Edwards et al. | 709/229 |

OTHER PUBLICATIONS

Richard Zulch, Database Tracking Description, May 24, 2005.
Ashlee Vance, Veritas goes hetero with new Netbackup, Apr. 26, 2005 http://www.theregister.co.uk/2005/04/26/veritas_netbackup_six/.
Powerquest Datakeeper.

* cited by examiner

*Primary Examiner*—John R. Cottingham
*Assistant Examiner*—Mohammed R Uddin
(74) *Attorney, Agent, or Firm*—Van Pelt, Yi & James LLP

(57) ABSTRACT

A method for tracking file system backups is disclosed. The method comprises receiving a request to perform a backup with respect to a data set comprising a file system or a portion thereof and automatically associating the requested backup with any previously performed backups, if any, that would be required to be available in order to restore the data set to a state associated with the requested backup.

24 Claims, 10 Drawing Sheets

TRACKING FILESYSTEM BACKUPS

FIELD OF THE INVENTION

The present invention relates generally to processing data. More specifically, processing related to backup and/or restoration of data is performed.

BACKGROUND OF THE INVENTION

Data backup for a computer system's stored data involves storing, at different times, copies of at least a portion of the data in a secondary storage location, e.g., on a secondary storage media or device or in a secondary location on a primary storage media or device. The copies are often compressed and can be stored as part of a complete set of copies of a computer's stored data. In a given backup operation all or less than all of the data comprising a backed up data set may be copied. The term "full backup" is used herein to refer to an operation in which a copy of all data comprising a backed up data set is stored to a backup destination (e.g., media). The term "differential backup" is used to refer to a backup operation in which only the differences between the data set in its state at the time the differential backup is performed and the state in which the data set was in when a previously-performed full backup was performed are stored. The term "incremental backup" refers to a backup operation in which data that is new or has changed since a prior full, differential, or incremental backup is stored. Differential and incremental backups can improve efficiency because they more effectively use storage space in the secondary storage location and require less time and resources to perform than a full backup. Proper restoration of data from a backup requires the availability of the correct chain of incremental, differential, and/or full backup(s). To restore a data set fully using a differential backup, for example, the full backup on which it is based must also be available. Likewise, to restore from an incremental backup the full backup and any intervening differential and/or incremental backup(s) with which the incremental backup is associated must be available. If the full backup on which a differential backup was based or any backup in a chain of backups on which an incremental backup was based is not available, then the data set cannot be restored to a state associated with the differential or incremental backup. Selecting a proper backup type (full, differential, or incremental) also requires an understanding of the availability of the chain of incremental, differential, and/or full backup(s). For example, if a full backup is not available, then only a full backup should be performed in order to ensure that data can be restored from the backup. Currently, the type of backup to be performed typically is selected manually, e.g., by an administrator or other user, and the prior backup(s) upon which a differential or incremental backup is based typically is/are tracked manually, which increases costs and introduces the risk of human error potentially resulting in loss of data. Therefore, there is a need to be able to automatically enable proper restoration and selection of backup types.

BRIEF SUMMARY OF THE INVENTION

Tracking file system backups is disclosed. A request is received to perform a backup with respect to a data set comprising a file system or a portion thereof. The requested backup is automatically associated with any previously performed backups, if any, required to be available in order to restore the data set to a state associated with the requested backup.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Tracking file system backups is disclosed. A partial (i.e., other than full) backup is automatically associated with one or more prior backups that would be required to be available in order to restore the data set to a state associated with the partial backup. In various embodiments, information regarding the associated backups is used to help select a backup type for a backup, to indicate available data sets for restoration, or to help in the proper restoration of a data set. In some embodiments, for those files or other data to be included in a backup, source or application software linked files/directories that are not explicitly selected but are associated with and required to use meaningfully a file to be included in the backup are automatically located and included in the backup as well. In some embodiments, if data to be included in a backup is indicated by indicating a restore point associated with an incremental, differential, or other non-full backup, corresponding data from prior full, incremental, and/or differential backups that would be required to reconstruct the source data set as it existed at a time associated with the restore point are identified and retained automatically.

Figure 1:
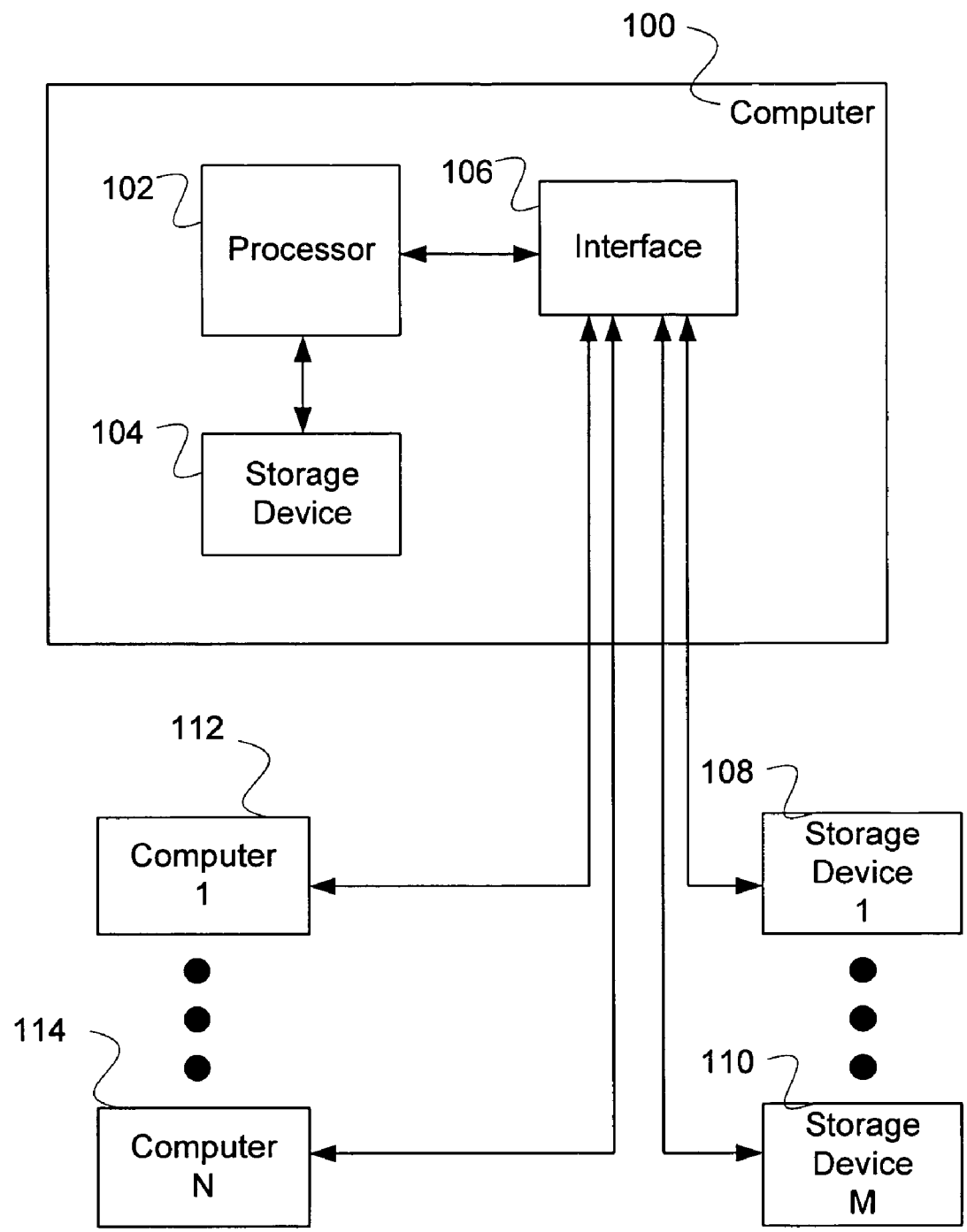
FIG. 1 illustrates an embodiment of a system for tracking file system backups.

FIG. 1 illustrates an embodiment of a system for tracking file system backups. In the example shown, computer 100 contains processor 102 for executing the instructions relevant to the system for tracking file system backups, storage device 104 for storing instructions for processor 102, and communication interface 106 capable of connecting to one or more computers and to one or more storage devices. In various embodiments, communication interface 106 to the one or more computers and the one or more storage devices includes a local area network interface, a wide area network interface, an Ethernet interface, and/or a World Wide Web interface. The plurality of computers (represented in FIG. 1 by first computer 112 and $n^{th}$ computer 114) contain files/directories that may need to be backed up or may contain storage devices (e.g., disk drives) that are used to hold backup data. The plurality of storage devices (represented in FIG. 1 by first storage device 108 and $m^{th}$ storage device 110) may contain files/directories that may need to be backed up or may comprise storage devices and/or be associated with removable or other storage media that are used to hold backup data. In some embodiments, communication interface 106 connects to no computers. In some embodiments, communication interface 106 connects to no storage devices. In some embodiments, computer 100 is configured to track file system backups associated with one or more of computers 112-114 and/or storage devices 108-110, as described more fully below. In some embodiments, all or part of the file system backup data that is tracked by computer 100 may be associated with source data associated with computer 100. In some embodiments, the file system backup data that is tracked may itself reside on computer 100, e.g., on a hard drive.

Figure 2:
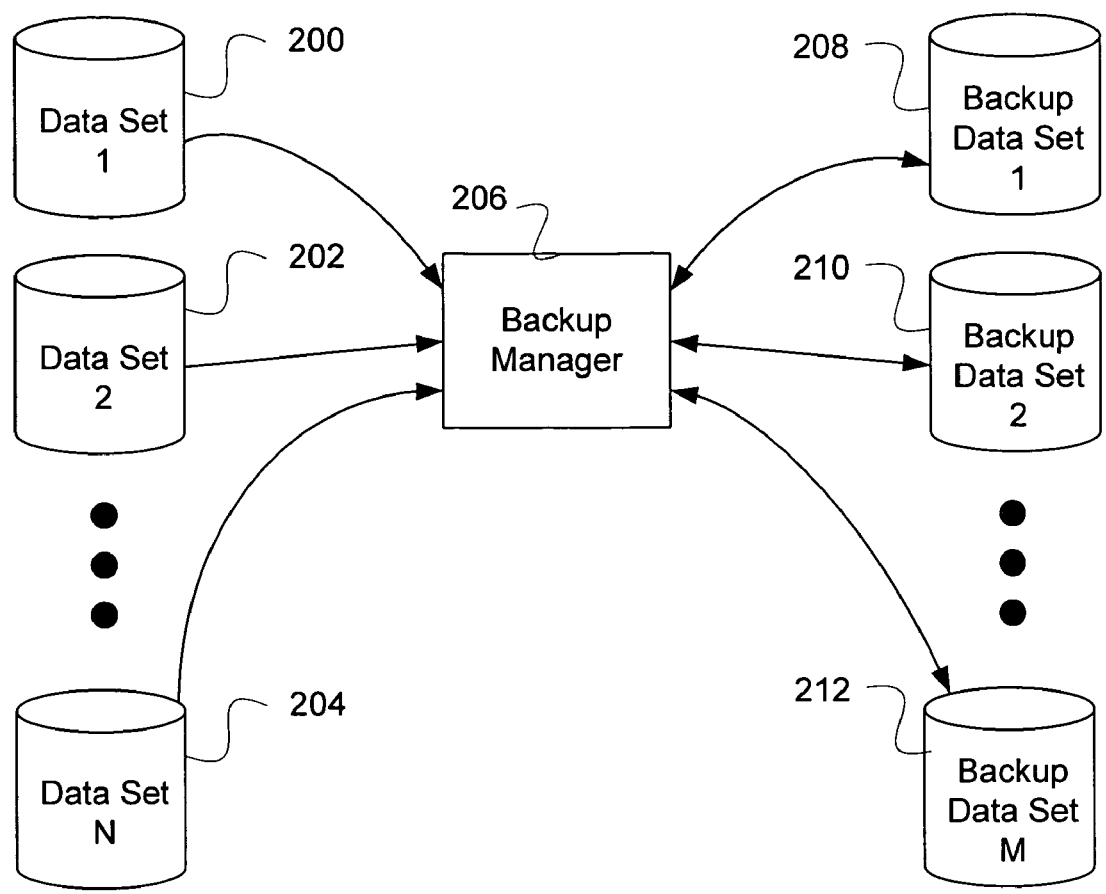
FIG. 2 illustrates an embodiment of a system for tracking file system backups.

FIG. 2 illustrates an embodiment of a system for tracking file system backups. In the example shown, a plurality of data sets (represented in FIG. 2 by first data set 200, second data set 202, and $n^{th}$ data set 204) are processed by backup manager 206 to create a plurality of backup data sets (represented in FIG. 2 by first backup data set 208, second backup data set 210, and $m^{th}$ backup data set 212). In the example shown, backup manager 206 also tracks the plurality of backup data sets. In other embodiments, tracking may be performed at least in part by a system or process other than a system or process used to create the backup data sets. In some embodiments, tracking may be performed with respect to a single backup data set comprising backup data associated with a single set of source data.

Figure 3:
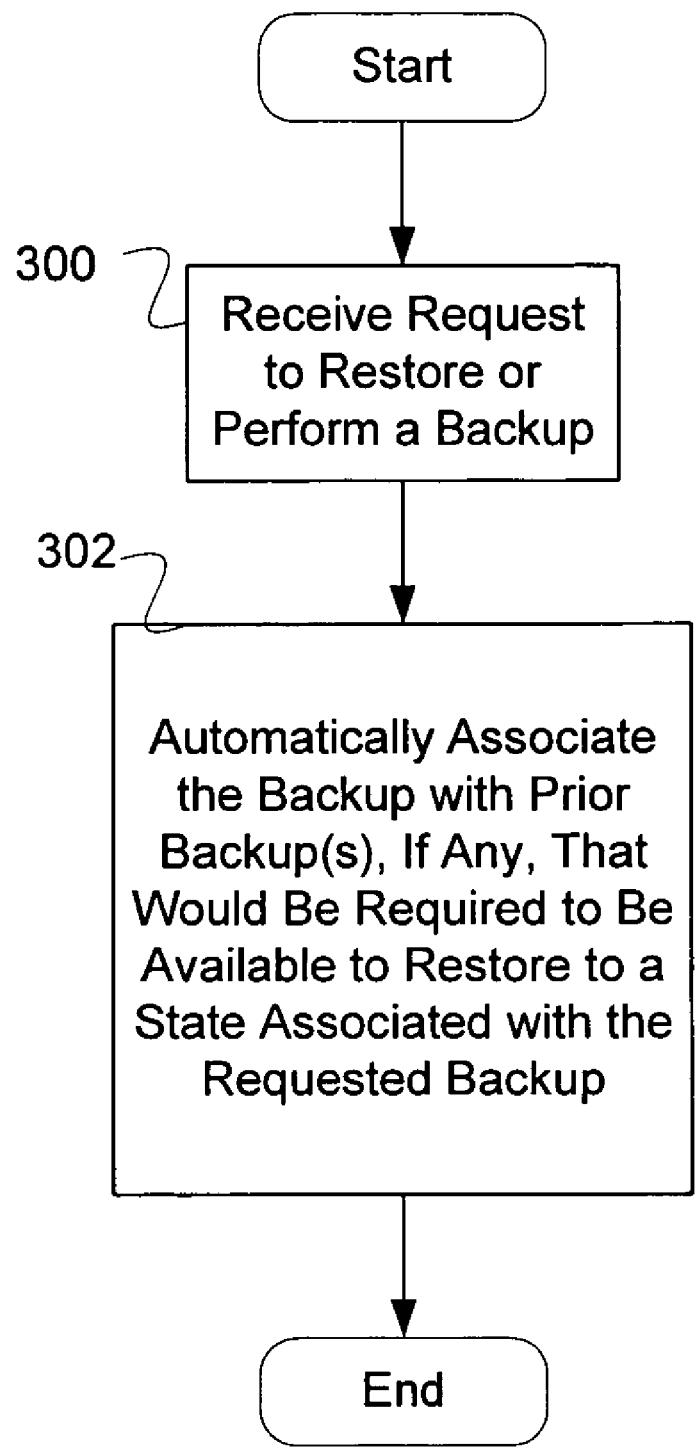
FIG. 3 illustrates an embodiment of a process for tracking file system backups.

FIG. 3 illustrates an embodiment of a process for tracking file system backups. In the example shown, in 300 a request is received to restore from a specified backup or perform a backup. In 302, the backup is automatically associated with prior backup(s), if any, that would be required to be available to restore to a state associated with the requested backup. In some embodiments, automatically associating includes determining based at least in part on a backup type associated with the requested backup whether one or more previously performed backups are or would be required to be available in order to restore the data set to the state associated with the requested backup.

Figure 4:
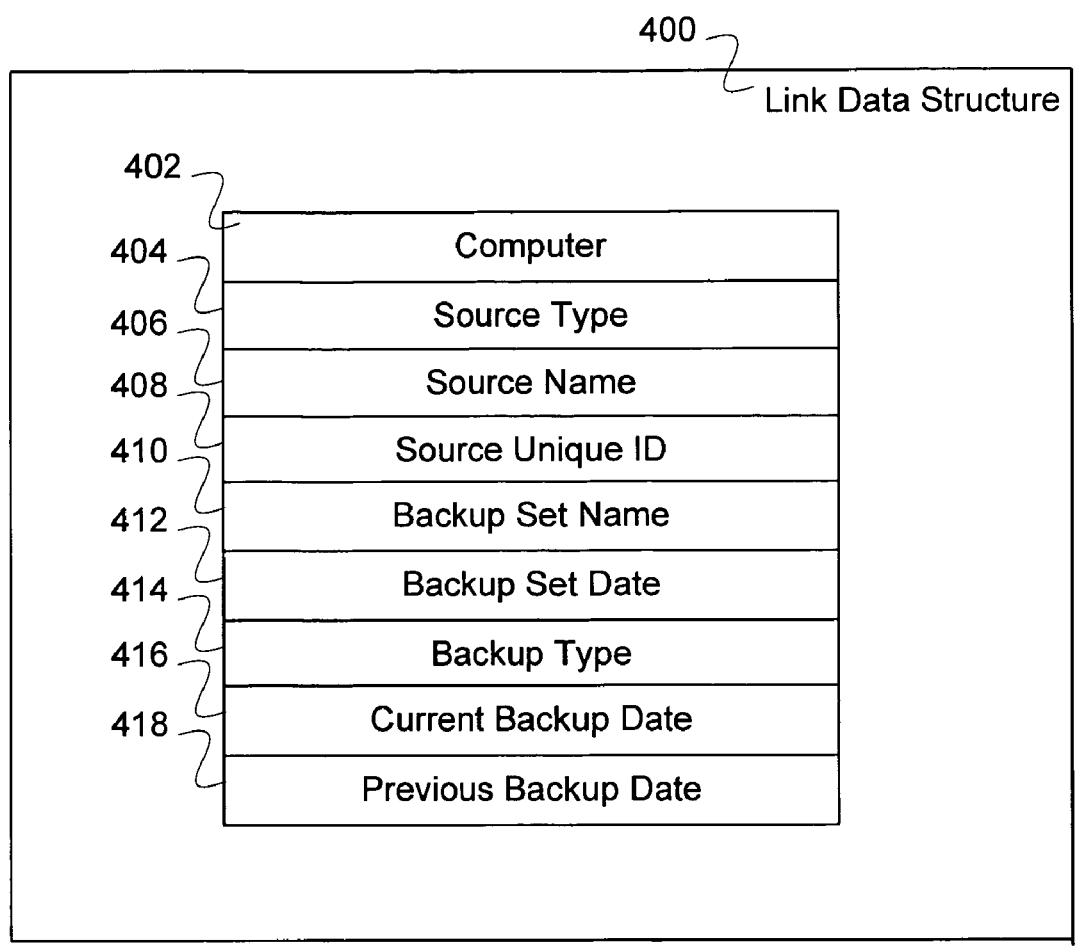
FIG. 4 illustrates an example of a link data structure as implemented in one embodiment.

FIG. 4 illustrates an example of a link data structure as implemented in one embodiment. In the example shown, link data structure 400 includes a source computer field 402 in which data identifying the source of the backup data is stored. Source computer 402 can be a computer name, computer identifier, or network machine name. Additional fields included in link data structure 400 are source type 404, source name 406, and source unique ID 408. Source type 404 is a storage volume on or associated with a computer, for example the C: drive, or a database, for example an SQL or Exchange database. Source name 406 is the name of the storage volume or database. Source unique ID 408 is a unique identifier for the source. In some embodiments, the unique identifier for the source is the create date of the source. Link data structure 400 includes data entries backup set name 410, backup set date 412, backup type 414, current backup date 416, and previous backup date 418. Backup set name 410 is the name of the backup set. Backup set date 412 is the date of creation of the backup set. Backup type 414 is a full backup, a differential backup, or an incremental backup. In some embodiments, an incremental backup comprises a log backup. Current backup date 416 is the date of the current backup. In some embodiments, the date of the current backup includes the time. Previous backup date 418 is the date of the previous backup. In some embodiments, the date of the previous backup includes the time. In some embodiments, a tracking data structure includes one or more link data structures. One or more link data structures can be used to derive a backup tree reflecting the relationship between two or more backups.

Figure 5:
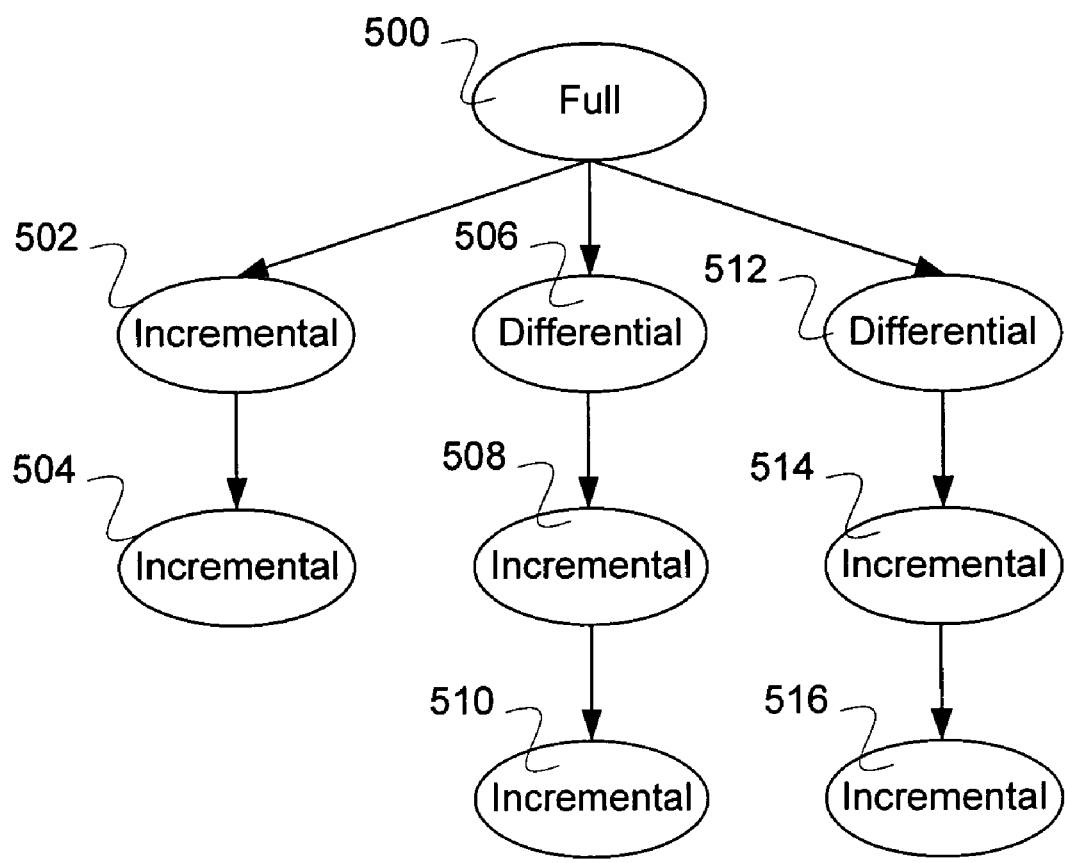
FIG. 5 illustrates an example of a representation of a backup tree in one embodiment.

FIG. 5 illustrates an example of a representation of a backup tree in one embodiment. In this example, the connections between backups of different types that stem from full backup 500 are shown. Differential backups stem from full backups; for example, differential backup 506 and 512 stem from full backup 500. Incremental backups stem from full, differential, or prior incremental backups; for example, incremental backup 502 stems from full backup 500; incremental backups 508 and 514 stem from differential backups 506 and 512, respectively; and incremental backups 504, 510, and 516 stem from incremental backups 502, 508, and 514, respectively. In order to restore a data set to a state associated with a given backup, a differential backup requires that the full backup that it stems from be available. Also, an incremental backup requires a full chain of incremental and/or differential backups up to the full backup that the incremental backup stems from be available in order to restore a data set to a state associated with a given backup.

Figure 6:
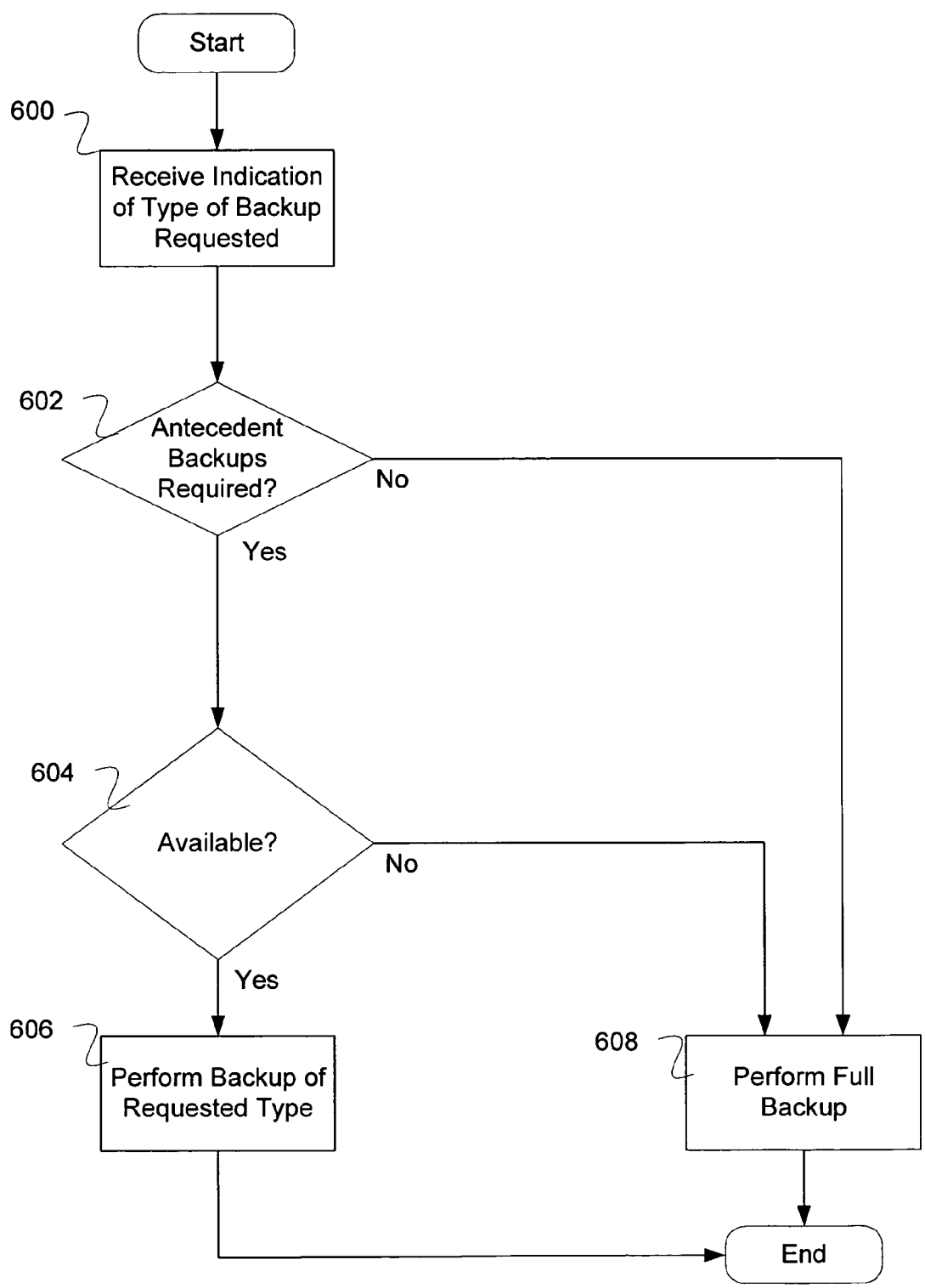
FIG. 6 illustrates an embodiment of a process for automatically selecting and performing a backup type.

FIG. 6 illustrates an embodiment of a process for automatically selecting and performing a backup type. In some embodiments, the process in FIG. 6 implements 302 of FIG. 3 in the event that a request is received to perform a backup. In the example shown, an indication is received of the type of backup requested. At 600, an indication of a type of backup requested is received. In 602, it is determined if there are any antecedent backups required. Antecedent backups include the backups that would be required to be available in order to restore the data set to a state associated with the requested backup. For example, if the requested backup is an incremental backup, then the full chain of incremental and/or differential backups up to the full backup that the requested incremental backup stems from are antecedents to the requested incremental backup. If it is determined that there are no antecedent backups required, i.e., that a full backup has been requested, then a full backup is selected and performed in 608 and the process ends. If it is determined that there are antecedent backups required, then in 604 it is determined if the antecedent backups are available. If the antecedent backups are not available, then in 608 a full backup is selected and performed, even though a non-full backup was requested, and the process ends. If the antecedent backups are available, then in 606 the requested type of backup is performed and the process ends.

Figure 7:
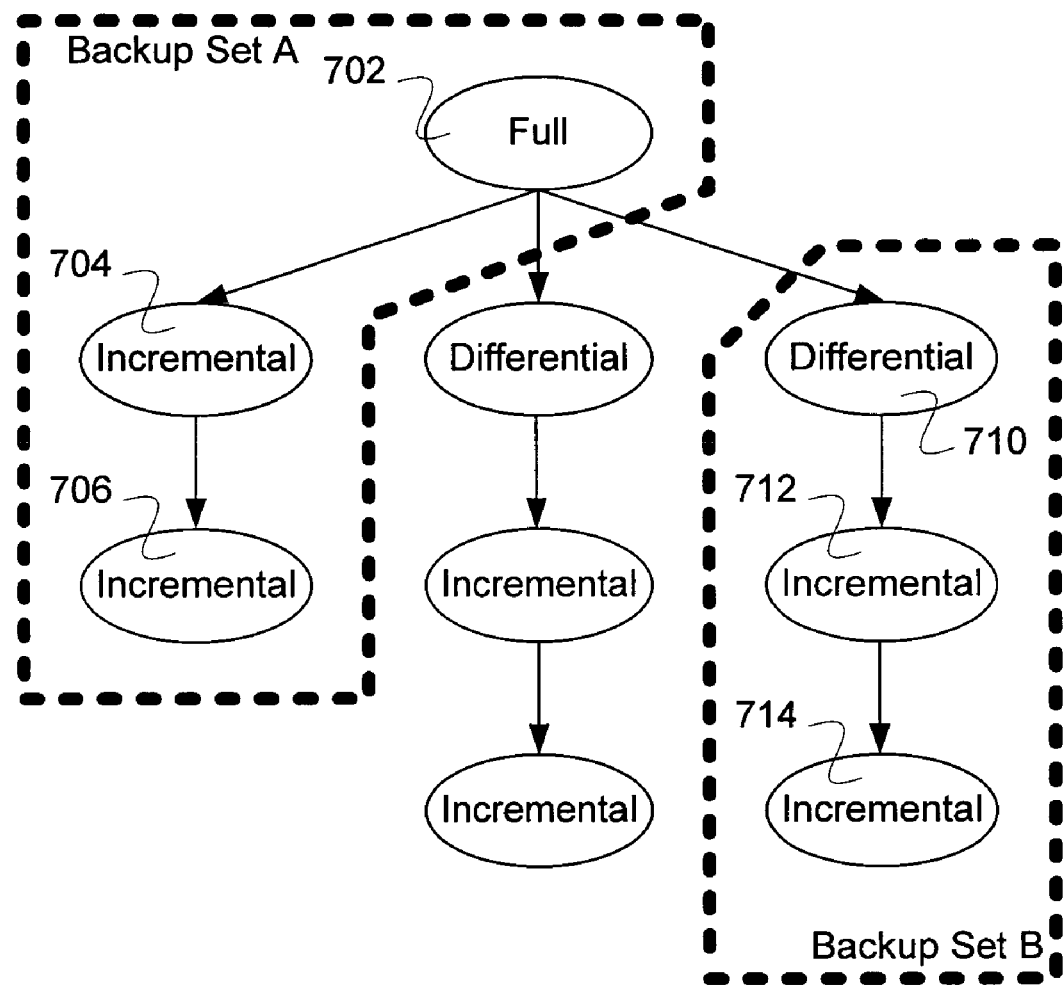
FIG. 7 illustrates an example of a backup tree with backups stored in a plurality of backup sets in one embodiment.

FIG. 7 illustrates an example of a backup tree with backups stored in a plurality of backup sets in one embodiment. In the example shown, backup set A includes full backup 702, incremental backup 704, and incremental backup 706. Backup set B includes differential backup 710, incremental backup 712, and incremental backup 714. In the event that a request is received for adding an incremental to incremental 706 of backup set A, then because all antecedents (incremental 706, incremental 704, and full 702) up to and including full backup 702 are available, an incremental backup is possible. In the event that a request is received for adding an incremental to incremental 714 of backup set B and if backup set A is also available, then because all antecedents (incremental 714, incremental 712, differential 710, and full 702) up to and including full backup 702 are available, an incremental backup is possible. In the event that a request is received for adding an incremental to incremental 714 of backup set B and if backup set A is not available, then because all antecedents (incremental 714, incremental 712, differential 710, and full 702) up to and including full backup 702 are not available (full backup 702), an incremental backup is not possible, a full backup is selected and performed instead of the requested incremental.

Figure 8:
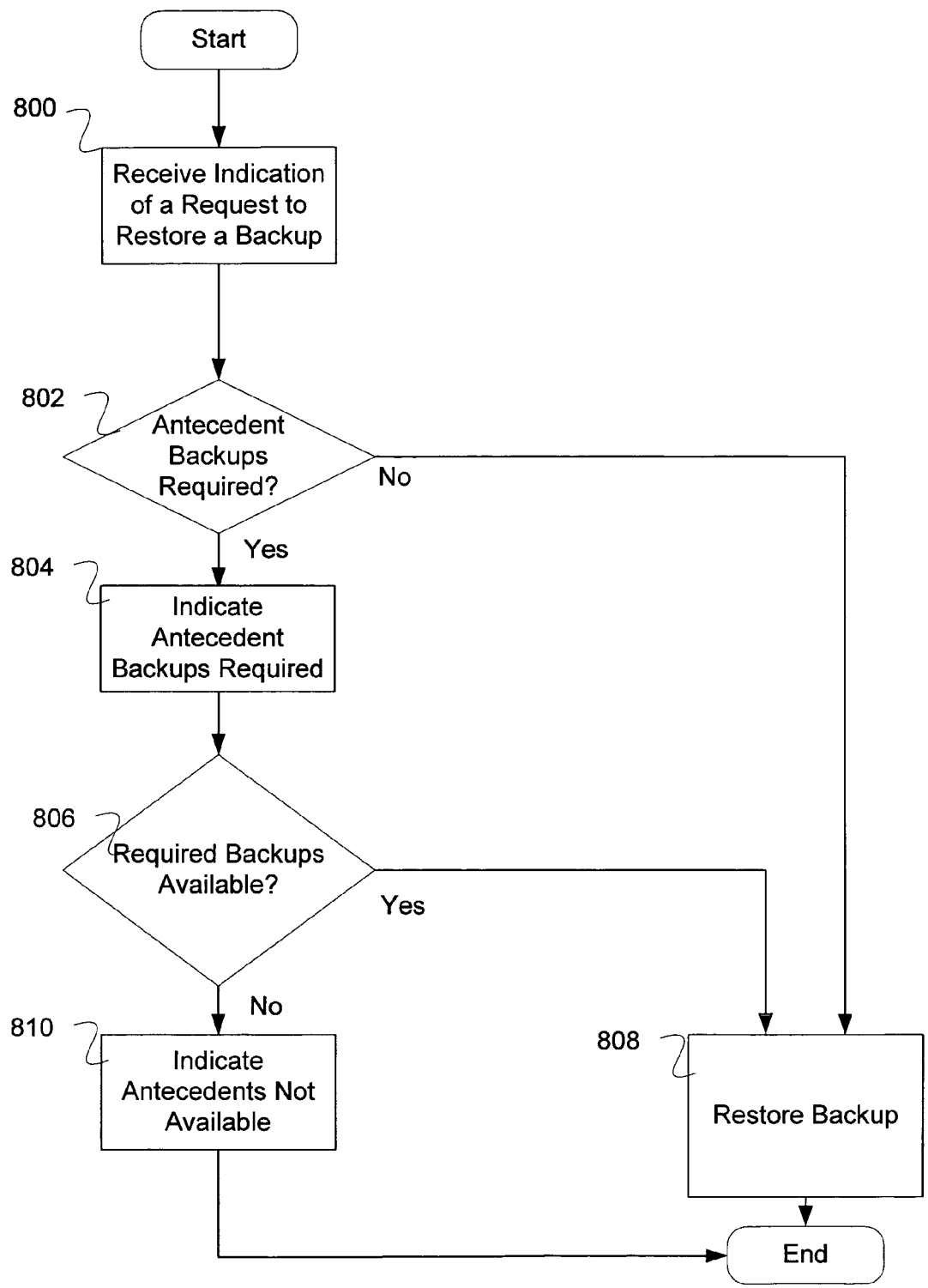
FIG. 8 illustrates an embodiment of a process for identifying backups required, if any, to restore a data set based on a particular backup.

FIG. 8 illustrates an embodiment of a process for identifying backups required, if any, to restore a data set based on a particular backup. In some embodiments, the process in FIG. 8 is used to implement 302 in FIG. 3 in the event that a request is received to restore a data set to a state associated with a backup specified in the request. In the example shown, in 800 an indication of a request is received to restore a data set based on a backup specified in the request. In 802, it is determined if antecedent backups are required in order to restore the data set to a state associated with the requested backup. If no antecedent backups are required, i.e., the requested backup is a full backup such that no other backups are required to restore the data set to a state associated with the requested backup, then in 808 the backup is restored and the process ends. If antecedent backups are required, then in 804 it is indicated that antecedent backups are required. In some embodiments 804 is omitted. In 806, it is determined if the required antecedent backups are available. If the required antecedent backups are available, then in 808 the backup is restored and the process ends. In some embodiments, 808 includes prompting an administrator or other user to insert a backup media volume associated with one or more antecedent backups. If the required antecedent backups are not available, then in 810 it is indicated that the antecedents are not available and the process ends.

In some embodiments, it is determined if antecedent backups are required in order to restore data to a state associated with all backups known to be available. An indication can then be given as to which backups can be restored given the available backups.

Figure 9:
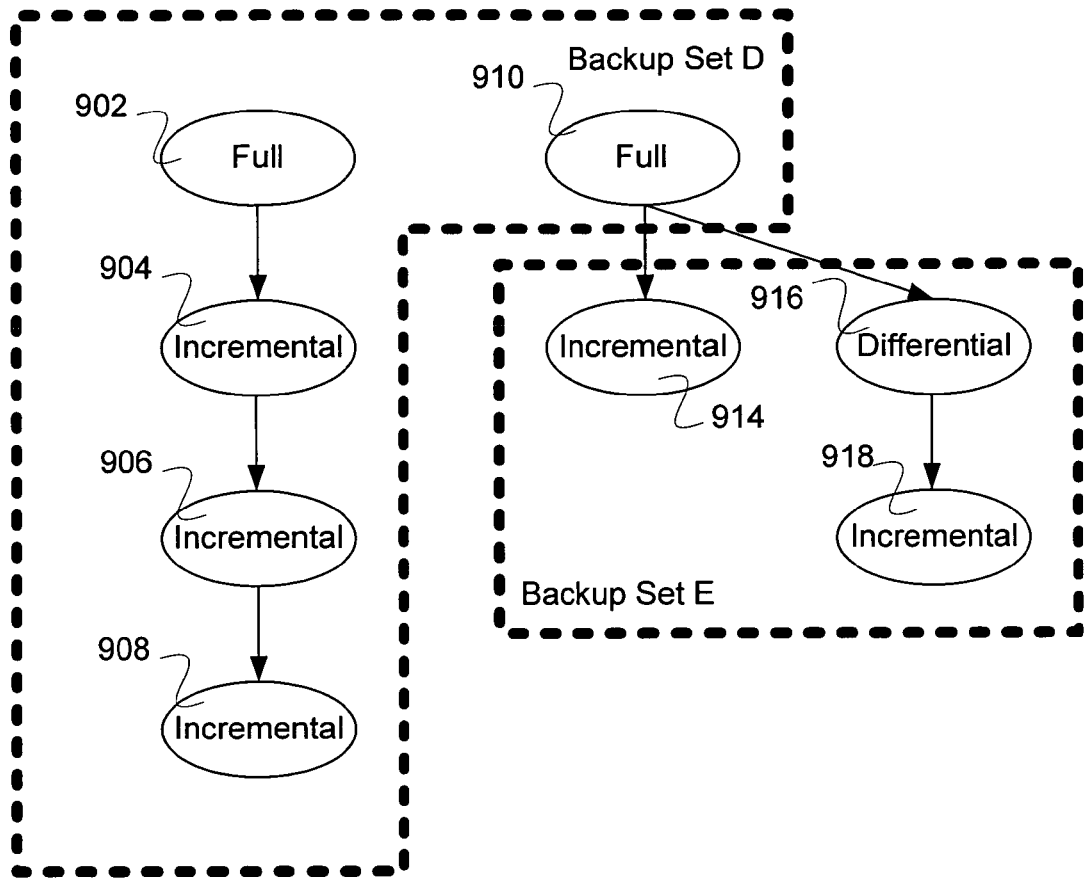
FIG. 9 illustrates an example of a backup tree with backups stored in a plurality of backup sets in one embodiment.

FIG. 9 illustrates an example of a backup tree with backups stored in a plurality of backup sets in one embodiment. In the example shown, backup set D includes full backup 902, incremental backup 904, incremental backup 906, incremental backup 908, and full backup 910. Backup set E includes incremental backup 914, differential backup 916, and incremental backup 918. If an indication is received to restore a backup in backup set D, then checking for the required antecedents for restoration will determine that the required antecedents are available. For example, if an indication is received to restore the data associated with incremental backup 906, then checking for the required antecedents for restoration determines that incremental backup 904 and full backup 902 are available, so restoration can take place. If an indication is received to restore a backup in backup set E, then checking for the required antecedents for restoration will determine that the required antecedents are not available in backup set E; Full backup 910 of backup set D is required to be available in order to restore incremental backup 914, differential backup 916, and incremental backup 918.

Figure 10:
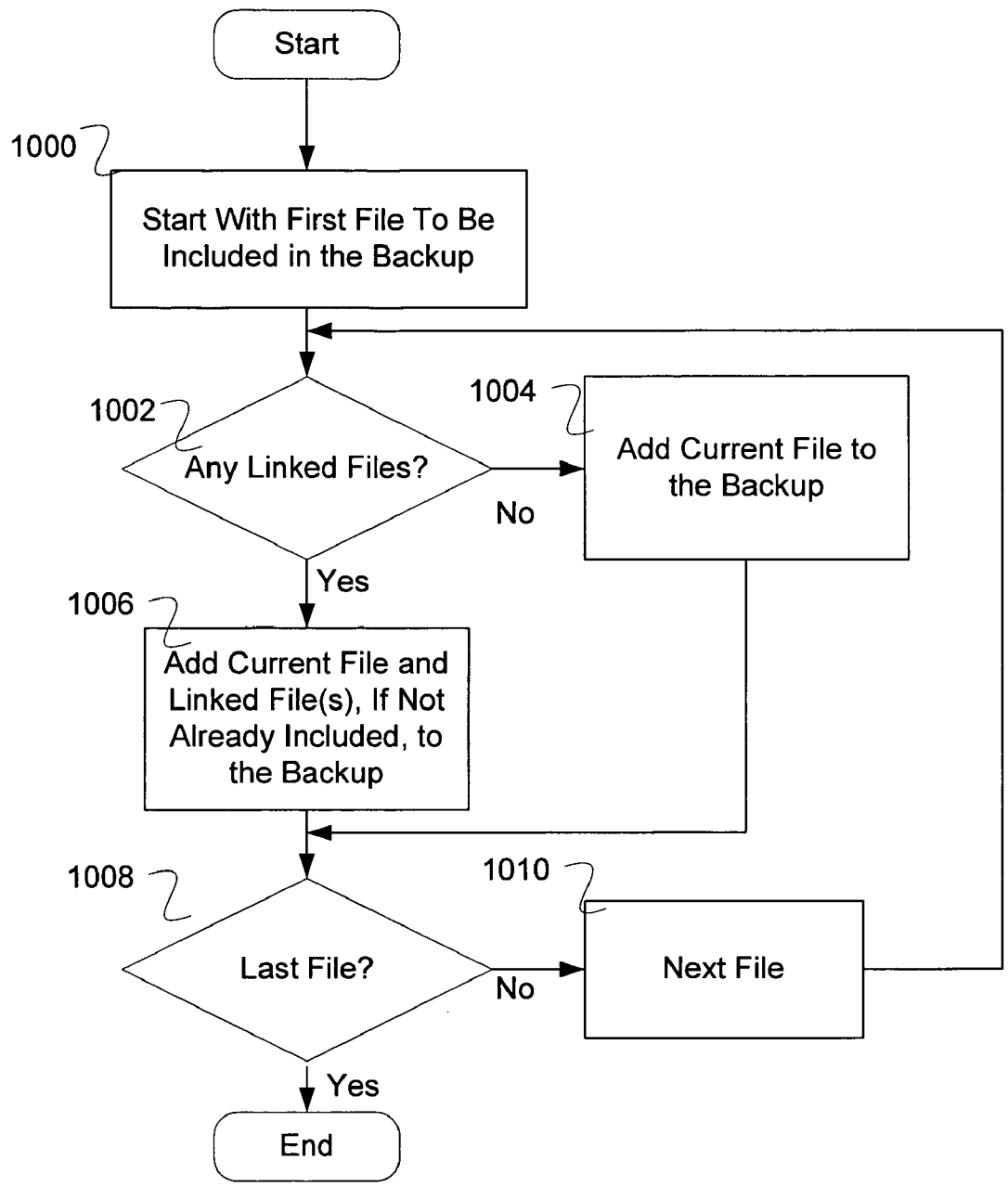
FIG. 10 illustrates an embodiment of a process for automatically adding to a backup, if not already included, a file that is linked, e.g., by an associated application program, to a file that is requested to be included backed up.

FIG. 10 illustrates an embodiment of a process for automatically adding to a backup, if not already included, a file that is linked, e.g., by an associated application program, to a file that is requested to be included backed up. In some embodiments, files that are linked by source or application software to a file requested to be included in the backup and that would be required to be available in order to use the requested file meaningfully if the file (and other data in the data set) was restored using the backup are automatically identified and included in the backup. In 1000, an indication is received that a first file is to be included in a backup. In 1002, it is determined if there are any linked files. If there are no linked files, then in 1004 the current file is added to the backup and control is passed to 1008. If there are linked files, then in 1006 the current file and linked file(s), if not already included in the backup, are added to the backup. In 1008, it is determined if it is the last file. If it is not the last file, the next file is selected in 1010 and control passes to 1002. If it is the last file, the process ends. In various embodiments, indication of links by source or application software can be indicated by a user of the backup system, a system administrator, using a graphical user interface, a heuristic, a rule, a preference file, a predetermined list, or any other method used for indicating on a computer system, and/or data received, obtained, or derived from or generated by the source or application software, such as directory or folder structure, file name conventions, etc.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for tracking file system backups comprising:
   receiving a request to perform a non-full backup with respect to a data set comprising a file system or a portion thereof;
   automatically associating, using a processor, the requested non-full backup with any previously performed backups required to be available in order to restore the data set to a state associated with the requested non-full backup including by identifying one or more previously performed backups required to be available in order to restore the data set to the state associated with the requested non-full backup; wherein identifying one or more previously performed backups includes accessing a backup tree that includes (1) a plurality of nodes, each node corresponding to a full, incremental, or differential backup and (2) for each non-full backup, a link from a node corresponding to a given non-full backup to a node corresponding to an immediate antecedent backup that is required to be available in order to restore the data set to the state associated with the given non-full backup;

determining if the identified one or more previously performed backups are all available; if it is determined that the identified one or more previously performed backups are all available, performing, in response to the received request to perform a non-full backup, the requested non-full backup; and if it is determined that at least one of the identified one or more previously performed backups is not available, automatically performing, in response to the received request to perform a non-full backup, a full backup on the data set using the processor, including by accessing data included in the data set from a source device protected by a backup and/or recovery system.

2. A method as in claim 1, further comprising:
receiving an indication that a first file is to be included in a backup;
determine if there are one or more other files linked to the first file, wherein a linked file is required to be available to an application in order for the first file to be accessed via the application; and
in the event it is determined there are one or more other files linked to the first file, automatically including in the backup the one or more other files linked to the first file.

3. A method as recited in claim 1 further comprising:
receiving a request to perform a full backup with respect to the data set; and
performing, in response to the received request to perform a full backup, the requested full backup, wherein the steps of automatically associating and determining are skipped in the event a request to perform a full backup is received.

4. A method as recited in claim 1 further comprising if it is determined that the identified one or more previously performed backups are all available:
adding a node on a first backup tree, wherein the node corresponds to the requested non-full backup; and
creating a link in the first backup tree from the node corresponding to the requested non-full backup to a node corresponding to an immediate antecedent backup that is required to be available in order to restore the data set to the state associated with the requested non-full backup.

5. A method as recited in claim 1 further comprising if it is determined that at least one of the identified one or more previously performed backups is not available: creating a second backup tree having a root node corresponding to the full backup.

6. A method for tracking file system backups comprising:
receiving a request to restore a data set comprising a file system or a portion thereof to a state associated with a non-full backup;
automatically associating, using a processor, the requested non-full backup with any previously performed backups required to be available in order to restore the data set to the state associated with the requested non-full backup including by identifying one or more previously performed backups required to be available in order to restore the data set to the state associated with the requested non-full backup; wherein identifying one or more previously performed backups includes accessing a backup tree that includes (1) a plurality of nodes, each node corresponding to a full, incremental, or differential backup and (2) for each non-full backup, a link from a node corresponding to a given non-full backup to a node corresponding to an immediate antecedent backup that is required to be available in order to restore the data set to the state associated with the given non-full backup;

determining if the identified one or more previously performed backups are all available;
if it is determined that the identified one or more previously performed backups are all available, performing, in response to the received request to restore the non-full backup, the requested restoration of the data set to the state associated with the requested non-full backup; and
if it is determined that at least one of the identified one or more previously performed backups is not available, indicating those previously performed backups that are not available in response to that the received request to restore the non-full backup cannot be performed.

7. A method as recited in claim 6 further comprising:
receiving a request to restore a data set to a state associated with a full backup; and
performing, in response to the received request to restore the full backup, the requested restoration of the data set to the state associated with the requested full backup, wherein the steps of automatically associating and determining are skipped in the event a request to restore a full backup is received.

8. A method as recited in claim 6 further comprising:
determining, based at least in part on those backups which are available, those backups, if any, which can be restored; and
displaying a list of those backups, if any, which can be restored.

9. A system for tracking file system backups comprising:
a processor configured to:
receive a request to perform a non-full backup with respect to a data set comprising a file system or a portion thereof;
automatically associate the requested non-full backup with any previously performed backups required to be available in order to restore the data set to a state associated with the requested non-full backup including by identifying one or more previously performed backups required to be available in order to restore the data set to the state associated with the requested non-full backup; wherein identifying one or more previously performed backups includes accessing a backup tree that includes (1) a plurality of nodes, each node corresponding to a full, incremental, or differential backup and (2) for each non-full backup, a link from a node corresponding to a given non-full backup to a node corresponding to an immediate antecedent backup that is required to be available in order to restore the data set to the state associated with the given non-full backup;
determine if the identified one or more previously performed backups are all available;
if it is determined that the identified one or more previously performed backups are all available, perform, in response to the received request to perform a non-full backup, the requested non-full backup; and
if it is determined that at least one of the identified one or more previously performed backups is not available, automatically perform, in response to the received request to perform a non-full backup, a full backup on the data set, including by accessing data included in the data set from a source device protected by a backup and/or recovery system; and
a memory coupled to the processor and configured to provide instructions to the processor.

10. A system as in claim 9, wherein the processor is further configured to:

receive an indication that a first file is to be included in a backup;

determine if there are one or more other files linked to the first file, wherein a linked file is required to be available to an application in order for the first file to be accessed via the application; and in the event it is determined there are one or more other files linked to the first file, automatically include in the backup the one or more other files linked to the first file.

11. A system as recited in claim 9, wherein the processor is further configured to:

receive a request to perform a full backup with respect to the data set; and perform, in response to the received request to perform a full backup, the requested full backup, wherein the steps of automatically associating and determining are skipped in the event a request to perform a full backup is received.

12. A system as recited in claim 9, wherein the processor is further configured to if it is determined that the identified one or more previously performed backups are all available:

add a node on a first backup tree, wherein the node corresponds to the requested non-full backup; and create a link in the first backup tree from the node corresponding to the requested non-full backup to a node corresponding to an immediate antecedent backup that is required to be available in order to restore the data set to the state associated with the requested non-full backup.

13. A system as recited in claim 9, wherein the processor is further configured to if it is determined that at least one of the identified one or more previously performed backups is not available: create a second backup tree having a root node corresponding to the full backup.

14. A system for tracking file system backups comprising:

a processor configured to:

receive a request to restore a data set comprising a file system or a portion thereof to a state associated with a non-full backup;

automatically associate the requested non-full backup with any previously performed backups required to be available in order to restore the data set to the state associated with the requested non-full backup including by identifying one or more previously performed backups required to be available in order to restore the data set to the state associated with the requested non-full backup; wherein identifying one or more previously performed backups includes accessing a backup tree that includes (1) a plurality of nodes, each node corresponding to a full, incremental, or differential backup and (2) for each non-full backup, a link from a node corresponding to a given non-full backup to a node corresponding to an immediate antecedent backup that is required to be available in order to restore the data set to the state associated with the given non-full backup;

determine if the identified one or more previously performed backups are all available;

if it is determined that the identified one or more previously performed backups are all available, perform, in response to the received request to restore the non-full backup, the requested restoration of the data set to the state associated with the requested non-full backup; and if it is determined that at least one of the identified one or more previously performed backups is not available, indicate those previously performed backups that are not available in response to that the received request to restore the non-full backup cannot be performed; and a memory coupled to the processor and configured to provide instructions to the processor.

15. A system as recited in claim 14, wherein the processor is further configured to:

receive a request to restore a data set to a state associated with a full backup; and perform, in response to the received request to restore the full backup, the requested restoration of the data set to the state associated with the requested full backup, wherein the steps of automatically associating and determining are skipped in the event a request to restore a full backup is received.

16. A system as recited in claim 14, wherein the processor is further configured to:

determine, based at least in part on those backups which are available, those backups, if any, which can be restored; and display a list of those backups, if any, which can be restored.

17. A computer program product for tracking file system backups, the computer program product being embodied in a computer readable storage medium and comprising computer instructions for:

receiving a request to perform a non-full backup with respect to a data set comprising a file system or a portion thereof;

automatically associating the requested non-full backup with any previously performed backups required to be available in order to restore the data set to a state associated with the requested non-full backup including by identifying one or more previously performed backups required to be available in order to restore the data set to the state associated with the requested non-full backup; wherein identifying one or more previously performed backups includes accessing a backup tree that includes (1) a plurality of nodes, each node corresponding to a full, incremental, or a differential backup and (2) for each non-full backup, a link from a node corresponding to a given non-full backup to a node corresponding to an immediate antecedent backup that is required to be available in order to restore the data set to the state associated with the given non-full backup;

determining if the identified one or more previously performed backups are all available;

if it is determined that the identified one or more previously performed backups are all available, performing, in response to the received request to perform a non-full backup, the requested non-full backup; and if it is determined that at least one of the identified one or more previously performed backups is not available, automatically performing, in response to the received request to perform a non-full backup, a full backup on the data set, including by accessing data included in the data set from a source device protected by a backup and/or recovery system.

18. A computer program product as recited in claim 17, further comprising:

receiving an indication that a first file is to be included in a backup;

determining if there are one or more other files linked to the first file, wherein a linked file is required to be available to an application in order for the first file to be accessed via the application; and in the event it is determined there are one or more other files linked to the first file, automatically including in the backup the one or more other files linked to the first file.

19. A computer program product as recited in claim 17 further comprising computer instructions for:
receiving a request to perform a full backup with respect to the data set; and
performing, in response to the received request to perform a full backup, the requested full backup, wherein the steps of automatically associating and determining are skipped in the event a request to perform a full backup is received.

20. A computer program product as recited in claim 17 further including computer instructions for if it is determined that the identified one or more previously performed backups are all available:
adding a node on a first backup tree, wherein the node corresponds to the requested non-full backup; and creating a link in the first backup tree from the node corresponding to the requested non-full backup to a node corresponding to an immediate antecedent backup that is required to be available in order to restore the data set to the state associated with the requested non-full backup.

21. A computer program product as recited in claim 17 further including computer instructions for if it is determined that at least one of the identified one or more previously performed backups is not available:
creating a second backup tree having a root node corresponding to the full backup.

22. A computer program product for tracking file system backups, the computer program product being embodied in a computer readable storage medium and comprising instructions for:
receiving a request to restore a data set comprising a file system or a portion thereof to a state associated with a non-full backup;
automatically associating the requested non-full backup with any previously performed backups required to be available in order to restore the data set to the state associated with the requested non-full backup including by identifying one or more previously performed backups required to be available in order to restore the data set to the state associated with the requested non-full backup; wherein identifying one or more previously performed backups includes accessing a backup tree that includes (1) a plurality of nodes, each node corresponding to a full, incremental, or differential backup and (2) for each non-full backup, a link from a node corresponding to a given non-full backup to a node corresponding to an immediate antecedent backup that is required to be available in order to restore the data set to the state associated with the given non-full backup; and
determining if the identified one or more previously performed backups are all available; if it is determined that the identified one or more previously performed backups are all available, performing, in response to the received request to restore the non-full backup, the requested restoration of the data set to the state associated with the requested non-full backup; and
if it is determined that at least one of the identified one or more previously performed backups is not available, indicating those previously performed backups that are not available in response to that the received request to restore the non-full backup cannot be performed.

23. A computer program product as recited in claim 22 further comprising computer instructions for:
determining, based at least in part on those backups which are available, those backups, if any, which can be restored; and
displaying a list of those backups, if any, which can be restored.

24. A system for tracking file system backups comprising:
a processor configured to:
receive a request to restore a data set comprising a file system or a portion thereof to a state associated with a non-full backup;
automatically associate the requested non-full backup with any previously performed backups required to be available in order to restore the data set to the state associated with the requested non-full backup including by identifying one or more previously performed backups required to be available in order to restore the data set to the state associated with the requested non-full backup; wherein identifying one or more previously performed backups includes accessing a backup tree that includes (1) a plurality of nodes, each node corresponding to a full, incremental, or differential backup and (2) for each non-full backup, a link from a node corresponding to a given non-full backup to a node corresponding to an immediate antecedent backup that is required to be available in order to restore the data set to the state associated with the given non-full backup;
determine if the identified one or more previously performed backups are all available;
if it is determined that the identified one or more previously performed backups are all available, perform, in response to the received request to restore the non-full backup, the requested restoration of the data set to the state associated with the requested non-full backup; and
if it is determined that at least one of the identified one or more previously performed backups is not available, indicate those previously performed backups that are not available in response to that the received request to restore the non-full backup cannot be performed; and
a memory coupled to the processor and configured to provide instructions to the processor.

* * * * *